United States Patent [19]

Legge et al.

[11] Patent Number: 4,855,011
[45] Date of Patent: Aug. 8, 1989

[54] ISOSTATIC SELF-CONTAINED BOND OR MOLD TOOL

[75] Inventors: John R. Legge, Durham, Conn.; Frank C. Rutherford, Toney, Ala.

[73] Assignee: United Technologies Corporation, Hartford, Conn.

[21] Appl. No.: 941,904

[22] Filed: Dec. 12, 1986

[51] Int. Cl.⁴ .................... B30B 15/34; B32B 31/20
[52] U.S. Cl. ................... 156/583.1; 156/382; 100/93 P; 100/211; 164/323; 425/405.2
[58] Field of Search ............ 100/211, 93 P; 156/382, 156/583.1, 583.3; 425/405 H; 164/323; 219/243, 445, 457, 466

[56] References Cited

U.S. PATENT DOCUMENTS

| | | | |
|---|---|---|---|
| 2,842,820 | 7/1958 | Brennan | 164/323 |
| 3,996,091 | 12/1976 | Daunt et al. | 156/285 |
| 4,383,426 | 5/1983 | Legge . | |
| 4,608,220 | 8/1986 | Caldwell et al. . | |
| 4,659,304 | 4/1987 | Day | 425/406 |

OTHER PUBLICATIONS

"Handbook for Adhesives–Section 4, Tooling for Adhesives" by Thomas W. Coughlin, American Cyanamid, Havre de Grace, MD.

Primary Examiner—Jerome Massie, IV
Assistant Examiner—Lori A. Cuervo

[57] ABSTRACT

An arrangement for manufacturing complex structures by transferring heat and pressure from ceramic molds to the article to be molded. The arrangement comprises a combination of ceramic molds, a flexible pressure bag means for applying pressure to at least one of the ceramic molds and a flexible pressure heating blanket means to apply pressure and heat against at least one of the ceramic molds.

9 Claims, 2 Drawing Sheets

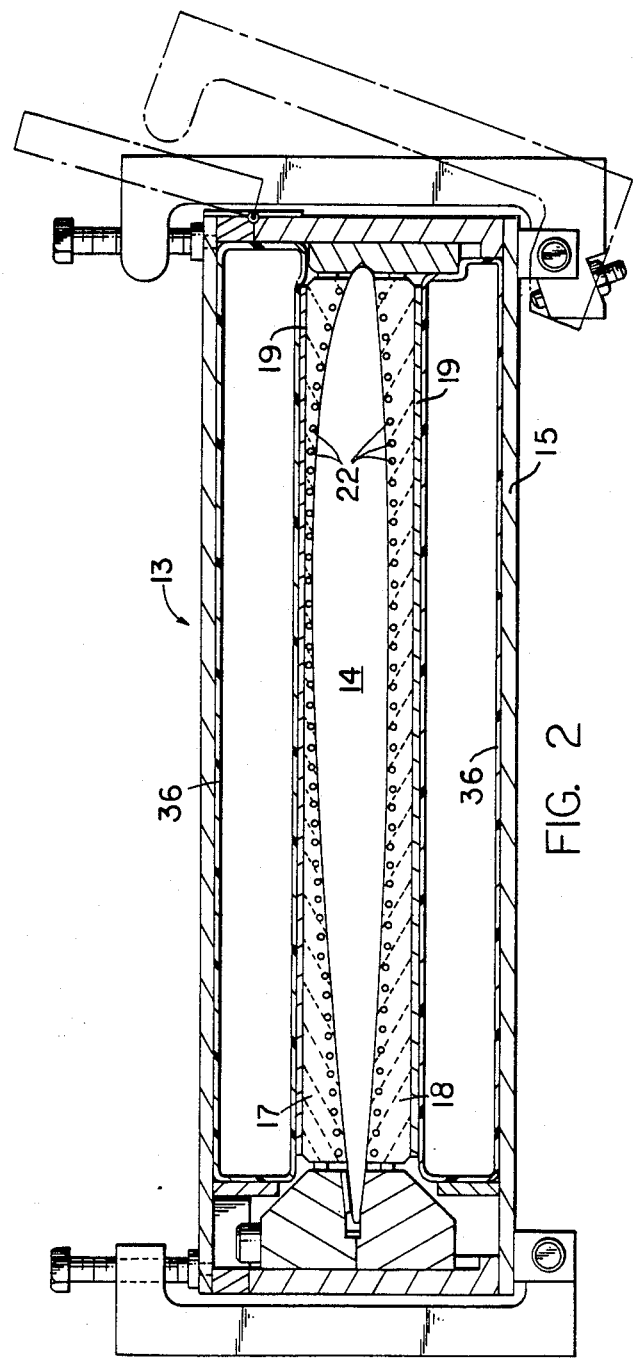

ISOSTATIC SELF-CONTAINED BOND OR MOLD TOOL

TECHNICAL FIELD

The invention herein is directed toward the technical field of apparatuses for making composite material structures of complex shape.

BACKGROUND ART

The manufacture of large metallic and composite material structures is generally very costly, not only because of the capital expense of the autoclaves and pressure vessels used in manufacture, but also because of the time and expense of operating such facilities.

It has, however, been necessary nonetheless to use the autoclaves and pressure vessels, because of the need to apply high, controllable temperature and pressure levels on the structures being molded or bonded. It would, of course, be preferable to make structures in some other fashion, both to reduce costs and to reduce the overall operating time consumed in bonding and curing operations.

DISCLOSURE OF INVENTION

The invention set forth and described herein is accordingly directed toward a bond or mold tool arrangement comprising in part ceramic form blocks.

The bond or mold arrangement thereby established, according to the invention, includes for example ceramic form blocks of predetermined shape or form conforming to the image of the structure to be molded or bonded. These ceramic form blocks thus established include, among other things, for example, a ceramic base mold and a cooperative ceramic mandrel, defining in combination the surface to be molded or bonded.

The arrangement includes a flexible pressure bag means for applying a controllable pressure on the form blocks. Further, the arrangement includes a flexible pressure blanket means to heat and apply pressure upon selected portions of the structure under manufacture. This pressure blanket may, for example, be thermally insulative, and is effective for example to apply isostatic pressure upon the manufactured structure. The blanket itself according to a preferred embodiment includes heating elements within its material.

One version of the invention in particular is directed toward an addressable matrix of heating elements established spacedly under the molding or bonding surface of at least one of the blocks, to ensure the even and controlled application of curing or bonding heat over the entire composite structure being manufactured.

Other features and advantages of the invention will be apparent from the specification and claims and from the accompanying drawing which illustrates an embodiment of the invention.

BRIEF DESCRIPTION OF THE DRAWING

FIG. 2 shows a cross section of a version of the invention used in manaufacturing wing structures.

BEST MODE FOR CARRYING OUT THE INVENTION

Figure 1:
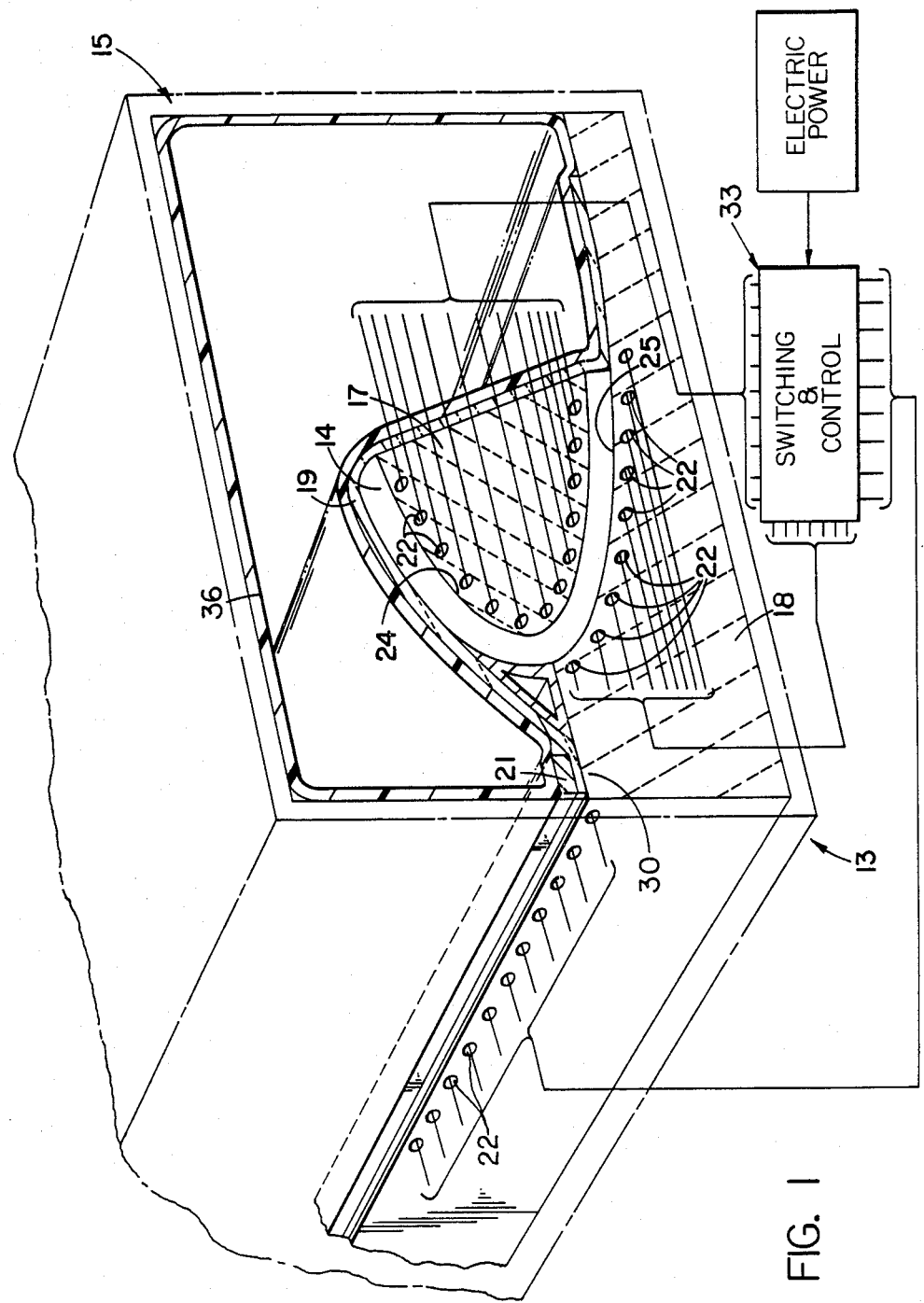
FIG. 1 shows an isometric section of the molding and bonding arrangement according to the invention herein which is suggestive of the wiring arrangement used to heat the structure being manufactured.

FIG. 1 shows the molding and bonding arrangement 13 according to the invention herein, enabling the accomplishment of bonding and molding operations with respect to structures 14 (e.g., composite, metallic) under manufacture. The bonding arrangement includes a containment structure 15 which typically has at least a joint or opening.

In particular, the bonding and molding arrangement 13 comprises first and second mold portions 18 and 17, (cooperable means) which preferably comprise ceramic material because ceramics can be easily cast in the desired complex shape. In addition, ceramics have a low coefficient of thermal expansion which is approximately equal to the coefficient of thermal expansion of fiber reinforced resin composites. Thus, in molding composites, failure to match the thermal expansion between the mold and the part may cause stresses, cracking and distortion of the product part. For example, steel tools have vastly dissimilar coefficients of thermal expansion from composites which during molding can result in unacceptable dimensional movement of the tooling mating surfaces in relation to the product part. Also, ceramics are thermally insulative which results in lower energy requirements, particularly when internal heating means are used. Finally, the ceramic mold can be easily repaired. An exemplary castable ceramic is Thermo-Sil ® fused silica available from Thermo Materials Corporation (Scottsdale, Georgia).

It is also preferred that the ceramic is substantially nonporous because fluids (e.g., air) and other liquid vehicles used in composites and plastics manufacturing can intrude into the porous surfaces and alter the chemistry at the surface of the product part. Additionally, release agents used to afford easy removal of the finished part can contaminate the mold surface pores. By substantially nonporous is meant a high degree of smoothness (e.g., glasslike, kiln-fired china). It is especially preferred that the ceramic has a glaze impregnation so that the mold surface is less apt to offer a surface capable of adhering or reacting with the product surface. The glaze impregnation is preferably 0.01 cm (0.005 inch) or more which is sufficient to completely fill the surface pores and/or cracks that would offer access to contaminating materials. This surface thickness would be the minimum necessary to prevent crazing or cracking of the glaze. It can be produced by brush, spray or other application of a glasslike composition (e.g., as in pottery glazing) to fill the porous texture of the mold surface. Fusing of the glasslike coating is efffected by heating to an elevated temperature (e.g., 816° C.–1093° C. (1500° F.–2000° F.)) at which point the surface will stabilize to a permanent glasslike finish. An exemplary glaze material is GL 611 ® glaze available from Duncan Enterprises (Fresno, California).

According to a preferred version of the invention, mold portion 17 is employed as a mandrel in arrangement 13. Additionally, molding or bonding combinations of one, two or more mold portions can be employed within the scope of the invention, including arrangements employing multiple mold and mandrel portions.

Additionally, arrangement 13 includes, according to one version of the invention, the additional feature of a flexible pressure heating blanket means 19 which, in a selected scheme thereof, fits in place over both mold portion 17 and the structure 14 being manufactured, preferably to provide heat to the structure 14. The flexible means may comprise a fiber reinforced polymeric film (e.g. blanket, sheet) or other substance that can withstand typical pressures and and temperatures of about 20 psi to about 500 psi and about 93° C. (200° F.) to about 538° C. (1000° F.). Preferably it has a controllable heating means such as resistance wire therein. The particular means chosen depends on the requisite molding conditions (which may vary from that described above) for the article to be molded. An exemplary material is a Kevlar ® fiber (E. I. DuPont De Nemours, Inc., Wilmington, Del.) based heater blanket available from Thermal Circuits, Inc. (Salem, Mass.).

More particularly, the pressure blanket 19 is held in place by a holding member 21 (e.g. beam), which secures the pressure blanket 19 in place against, for example, an edge portion 30 of ceramic mold 18.

Further, according to the invention herein, the ceramic mold 18 defines an inner surface 25 establishing one portion of the contour to be molded or bonded. Spaced immediately below surface 25 (preferably about 1 cm to about 3 cm and preferably at a depth equidistant to the mold surface in order that the mold surface is evenly heated) are heating elements 22, for example, resistance heaters, arranged in parallel grid arrangement as shown, permitting selected portions of surface 25 to be addressed with selected amounts of more or less heat as desired by controls 33. This type of grid arrangement facilitates superior differential area selective temperature control. It is preferable that the mold 18 has an arrangement of ducts for including the heating means such as resistance wire. If wire is cast in the ceramic, a fault or short can leave the heating means useless. But if the wire can be replaced (e.g., through ducts), a repair procedure can be effected. The ducts can be created by casting temporary self-deteriorating tubing (e.g., polymeric) in the desired array into the ceramic. The higher temperature ceramic process will vaporize the tubing (e.g., polymeric) (subsequent to the initial forming of the ducts) leaving the desired hollow ducts.

Similarly, the mold portion 17 of arrangement 13 defines its own molding contour or surface 24 which also contains a similar arrangement of spaced heating elements 22 (e.g., resistance heaters) underlying surface 24 at a regular or predetermined depth, comprising parallel (or grid) elements 22. This mold portion 17 may also include ducts and heating wire as described above.

Pressure blanket 19 applies selected isostatic pressure levels under direction of a pressurized flexible fluid pressure bag (e.g., air bag) 36 against the structure being manufactured and is effective for pressing mold portion 17 into cooperative relationship with the mold portion 18. The pressure can be regulated by controlling the air pressure of the bag. An exemplary air bag is a butanol rubber bladder which preferably has a Kevlar reinforcement and is available from Goodyear Co. (Akron, Ohio).

FIG. 2 shows another version of the invention herein, particularly disclosing an arrangement for manufacturing a selected wing structure, for example. In this instance, the arrangement 13 includes upper and lower mold portions 17 an 18.

In the case of arrangement 13, a more elaborate containment structure 15 is illustrated. As can be seen, the structure 15 can be opened and closed to permit the wing assembly 14 to be constructed and removed with respect to containment structure 15. Again, heating means 22 supplies heat to the article 14 to be molded. The air bag 36 applies pressure to the pressure blanket 19, ceramic molds 17 and 18, and the article 14 to be molded.

This invention provides an apparatus particularly adapted for molding composites and a variety of other materials (e.g., metals, resins) for use, for example, in nuclear equipment, toxic waste tratment equipment, large antenna dishes and other wave band array systems. However, it is particularly adapted for molding resin composites for use in the aerospace industry. It may also be used to bond two or more existing structures (e.g., composite articles together. The ceramic molds provide thermal insulation ease in shaping, repairability, and a desirable coefficient of thermal expansion. The internal heating elements facilitate controlled differential heating while eliminating the need for heating the entire apparatus. The flexible air bag and pressure blanket heater facilitates the application of the desired isostatic pressures without resorting to an expensive and awkward autoclave. Thus, the apparatus significantly reduces cycle times, labor and the need for moving equipment resulting in a significant advance to the field of molding articles.

It should be understood that the invention herein is not limited to the particular embodiments shown and described herein, but that various changes and modifications my be made without departing from the spirit and scope of this novel concept as defined by the following claims.

We claim:

1. An arrangement for manufacturing a composite article structure comprising:
   (a) first and second cooperable forming means for establishing a complex form therebetween, said first and second cooperable forming means comprising ceramic;
   (b) containment means for containing said first and second cooperable forming means;
   (c) said first and second cooperable forming means defining respective first and second inner surfaces for applying pressure upon said complex structure to be made therebetween;
   (d) at least one of said cooperable means containing a first controllable heating means for controllably applying heat to one of said inner surfaces including an arrangement of ducts spaced adjacent said inner surface for containing said heating means;
   (e) a flexible pressure bag means for applying controllable pressure between said containment means and at least one of said cooperable forming means; and
   (f) said arrangement further comprising a flexible pressure heating blanket means disposed adjacent said pressure bag means for applying controllable pressure and heat to at least one of said cooperable forming means;
   whereby heat and pressure are transferable from said flexible pressure heating blanket means to said manufactured complex structure in order to accomplish molding or bonding.

2. The arrangement of claim 1, further characterized in that said first controllable heating means includes a plurality of heating wires.

3. The arrangement of claim 1, wherein said second cooperable forming means contains a second heating means for controllably applying heat to said second inner surface.

4. The arrangement of claim 1, wherein said second heating means is spaced adjacent said second inner surface.

5. The arrangement of claim 1, wherein said second cooperable forming means includes an arrangement of ducts adjacent said second inner surface for containing said heating means.

6. The arrangement of claim 1, wherein said second heating means includes a plurality of heating wires.

7. The arrangement of claim 1, wherein said first and second ceramic forming means are substantially nonporous.

8. The arrangement of claim 7, wherein said ceramic cooperable forming means is impregnated with glaze.

9. The arrangement of claim 3, wherein said first and second heating means comprise a plurality of wires spaced apart and transverse to each other.

* * * * *